(12) United States Patent
De Castro et al.

(10) Patent No.: US 7,923,172 B2
(45) Date of Patent: Apr. 12, 2011

(54) STRUCTURES FOR GAS DIFFUSION MATERIALS AND METHODS FOR THEIR FABRICATION

(75) Inventors: Emory S. De Castro, Nahant, MA (US); Yu-Min Tsou, Princeton, NJ (US); Maria Josefina Cayetano, Tinton Falls, NJ (US); Jeffrey G. Morse, Lee, MA (US); Michael Schneider, Piscataway, NJ (US); Hua Deng, Warrington, PA (US)

(73) Assignee: BASF Fuel Cell GmbH, Frankfurt am Main (DE)

( * ) Notice: Subject to any disclaimer, the term of this patent is extended or adjusted under 35 U.S.C. 154(b) by 450 days.

(21) Appl. No.: 10/955,999

(22) Filed: Sep. 30, 2004

(65) Prior Publication Data

US 2005/0106450 A1    May 19, 2005

Related U.S. Application Data

(60) Provisional application No. 60/520,165, filed on Nov. 14, 2003.

(51) Int. Cl.
*H01M 4/36* (2006.01)
*H01M 4/02* (2006.01)

(52) U.S. Cl. ......................................... 429/534; 429/532

(58) Field of Classification Search ................ 429/534, 429/532

See application file for complete search history.

(56) References Cited

U.S. PATENT DOCUMENTS

| | | | | |
|---|---|---|---|---|
| 4,293,396 | A * | 10/1981 | Allen et al. | 205/533 |
| 6,017,650 | A | 1/2000 | Ramunni | |
| 6,106,965 | A * | 8/2000 | Hirano et al. | 429/30 |
| 6,350,539 | B1 * | 2/2002 | Wood et al. | 429/34 |
| 2003/0124414 | A1 * | 7/2003 | Hertel et al. | 429/44 |

FOREIGN PATENT DOCUMENTS

DE    198 40 517 A1    3/2000

* cited by examiner

*Primary Examiner* — Gregg Cantelmo
*Assistant Examiner* — Eugenia Wang
(74) *Attorney, Agent, or Firm* — Charles A. Muserlian

(57) ABSTRACT

An improved structure for gas diffusion electrodes and gas diffusion layers whereby fine gradients of porosity and hydrophobicity promote efficient gas transport, water removal and overall enhanced performance of Membrane Electrode Assemblies constructed with these components.

12 Claims, No Drawings

STRUCTURES FOR GAS DIFFUSION MATERIALS AND METHODS FOR THEIR FABRICATION

PRIOR APPLICATION

This application is a non-provisional application of U.S. Provisional Application Ser. No. 60/520,165 filed Nov. 14, 2003.

BACKGROUND OF INVENTION

1. Field of the Invention

The invention relates to gas diffusion structures such as gas diffusion electrodes and gas diffusion electrode backings for electrochemical applications, and to methods for producing the same.

2. Description of Related Art

Gas diffusion structures are increasingly used in electrochemical applications such as fuel cells and electrolyzers, particularly in those applications making use of ion-exchange membranes as separators and/or as electrolytes. A gas diffusion structure (also called a "gas diffuser") is normally comprised of a web, acting as a support, and of coating layers applied on one or both sides thereof. The coating layers have several functions, the most important of which are providing channels for water and gas transport and conducting electric current. Coating layers, especially the outermost ones, may also have additional functions such as catalyzing an electrochemical reaction and/or providing ionic conduction, particularly when they are used in direct contact with an ion-exchange membrane. For most applications, it is desirable to have a porous current conducting web (such as a carbon cloth, a carbon paper or a metal mesh) coated with current conducting layers. It is also desirable that the channels for water and for gas transport be separate channels, characterized by different hydrophobicity and porosity.

It is known in the art that gas diffusers may be advantageously provided with two different layers, an inner and an outer coating layer, having different characteristics: for instance, U.S. Pat. No. 6,017,650 discloses the use of highly hydrophobic gas diffusers coated with more hydrophilic catalytic layers for use in membrane fuel cells. U.S. Pat. No. 6,103,077 discloses methods for automatically manufacturing such type of gas diffusion electrodes and electrode backings with industrial coating machines. In the cited documents, the coating layers are composed of mixtures of carbon particles and a hydrophobic binder such as PTFE, and the methods of obtaining a diffusive and a catalytic layer with distinct characteristics comprise the use of different relative amounts of carbon and binder materials and/or the use of two different types of carbon in the two layers.

Also, gas diffusers having two layers with different porosity are known in the art: DE 198 40 517, for instance, discloses a bilayer structure consisting of two sub-structures with different porosity. Surprisingly, the layer with higher porosity and gas permeability is the one in contact with the membrane, while the less porous and permeable layer is the one that contacts the web. There is, in fact, a general understanding that a desirable porosity gradient should provide a less permeable structure for the layer in contact with the membrane, for example as disclosed for the catalytic layer of WO 00/38261. Although in such case, the porosity gradient is not obtained in a gas diffuser structure but only in a very thin catalytic hydrophilic layer in direct contact with an ion-exchange membrane, the general teaching that a less porous geometry is desirable for the side of a gas-fed electrode structure which has to be coupled to a membrane electrolyte may be regarded as common knowledge in the art.

Such type of bilayer gas diffusion structures show adequate performances in most applications; however, there are a few critical applications in which the gas diffuser architecture of the prior art does not meet the gas and water transport requirements to a sufficient extent. Particularly critical applications comprise, for instance, membrane fuel cells operating at relatively high temperature (close to or higher than 100° C.) and oxygen-depolarized aqueous hydrochloric acid electrolyzers, especially if operating at high current density or if depolarized with air or other depleted oxygen-containing mixtures instead of pure oxygen. In these cases, the optimum gas transport and water management are not achieved by means of a simple bilayer gas diffusion structure.

BRIEF SUMMARY OF INVENTION

It is an object of the invention to provide an improved gas diffusion structure which permits one to overcome the limitations and drawbacks of the prior art and an electrochemical cell making use of the same.

It is another object of the invention to provide a method for producing a gas diffusion structure overcoming the limitations and drawbacks of the prior art.

These and other objects and advantages of the invention will become obvious from the following detailed description.

DETAILED DESCRIPTION OF THE INVENTION

Under a first aspect, the invention is relative to a gas diffuser comprising a multilayer coating on a web, the coating being provided with fine gradients of porosity and hydrophobicity across the whole thickness. By fine gradient, it is intended a monotonous and substantially regular variation of the relevant parameter. Under another aspect, the invention is relative to an electrochemical cell, for instance a membrane fuel cell or an electrolysis cell, comprising a gas diffuser provided with a multilayer coating having fine gradients of porosity and hydrophobicity across the whole thickness. The invention is also relative to a method for producing a gas diffuser provided with a multilayer coating having fine gradients of porosity and hydrophobicity across the whole thickness.

As mentioned above, the gas diffusion electrodes of the prior art have always been pictured as a dual structure performing two separate functions in two distinct regions: an active, catalyzed region in contact with the membrane, directed to facilitating a three-phase reaction on the catalyst particles, requiring an extended interface provided with ionic and electronic conduction and therefore a remarkable hydrophilic character, and a region directed to gas diffusion and provided with a strong hydrophobic character to facilitate the transport of gas through its pores.

It has been found that it is surprisingly advantageous to provide, instead of this sudden step in hydrophobicity across the gas diffusion electrode structure, a fine gradient of hydrophobicity across the whole structure of a gas diffuser. The gas diffuser structure may still be provided with an active or catalyzed outer layer. However, in a most preferred embodiment, the physical properties of the catalyzed layer do not create a steep discontinuity with the rest of the structure, the hydrophobic gradient being rather established across the whole structure and extending also in the activated zone. Furthermore, in order to exploit the full properties of the present invention, a porosity fine gradient shall also be established across the whole gas diffusion structure, with larger pores on the coating layers in direct contact with the supporting web and smaller pores on the opposite surface, which may comprise a catalyzed portion.

In an alternative embodiment, the gas diffusion structure of the invention is comprised of a non-catalyzed portion having fine porosity and hydrophobicity gradients in the direction of its thickness, and of a superposed catalyzed potion, preferably having distinct porosity and hydrophobicity fine gradients in the direction of its thickness. In the following examples, it will be shown that the gas diffuser of the invention may be obtained by coating a single side of a web in multiple passes. However, it is also possible to obtain a gas diffusion structure with hydrophobicity and porosity fine gradients by coating both sides of a web in multiple passes, embedding the supporting web within the whole structure.

There are several possible ways to achieve simultaneous hydrophobicity and porosity fine gradients on a web, but not all of them are compatible with an industrial production carried out with automated coaters. For this reason, some preferred embodiments will be described hereafter representing the best modes of practicing the invention.

In one preferred embodiment, the gas diffuser of the invention is provided with a coating containing carbon and binder particles. Carbon particles are essentially used to provide conductivity to the structure but it is understood that other types of electrically conductive particles, for instance metal particles, may be used. Binders are used to impart structural properties to the coating, and may be also advantageously used to vary the hydrophobic/hydrophilic properties of the coating. Polymeric binders are preferred for this application, especially partially fluorinated or perfluorinated binders such as PTFE. In one preferred embodiment, the hydrophobicity and porosity fine gradients are simultaneously achieved by providing a multilayer coating in which the weight ratio of carbon to binder particles is systematically varied and a gas diffuser of the invention may thus consist of a variable number of individual coats, typically from 3 to 8. The higher is the number of coats, the better is the resulting diffuser in terms of fine gradient structure. However, the number of coats must be limited for practical reasons, and more importantly to maintain the required characteristics of gas permeability.

In another preferred embodiment, the hydrophobicity and porosity fine gradients are simultaneously achieved by providing a multilayer coating in which the weight ratio between two different types of carbon, a more hydrophobic carbon such as graphite or an acetylene black and a more hydrophilic carbon such as carbon black is systematically varied. In another preferred embodiment, both the weight ratio between two different types of carbon and the weight ratio of carbon to binder particles are systematically varied.

In another preferred embodiment, the hydrophobicity and porosity fine gradients are simultaneously achieved by providing a multilayer coating in which the weight ratio between two different types of binder, a hydrophobic carbon such as PTFE and a hydrophilic binder such as Nafion® is systematically varied. All of these different techniques to achieve simultaneous hydrophobicity and porosity fine gradients may be combined in several ways. In each of the previously mentioned embodiments, the carbon particles of the final coats may also include a catalyst supported thereon, for instance a noble metal catalyst generally imparting hydrophilic properties (catalyzed carbon). This is equivalent to having a gas diffuser provided with fine hydrophobicity and porosity gradients in the direction of its thickness, further provided with an electrocatalytic layer placed on top, wherein the fine hydrophobicity and porosity gradients extend also within such electrocatalytic layer. However, in an alternative embodiment, distinct hydrophobicity and porosity gradients may be present for the non catalyzed and for the catalyzed portion of the gas diffuser of the invention. In a less preferred embodiment, the hydrophobicity and porosity fine gradients may extend only in the non catalyzed portion of the diffuser, and an overlaid catalyzed portion may not be provided with fine gradients at all.

In one preferred embodiment of the invention, the binder to carbon weight in each layer is between 0.1 and 0.7 and when two different types of carbon are used, the weight ratio between said two types of carbon is typically between 1:9 and 9:1. However, more than two types of carbon may be used in the construction of the gas diffuser of the invention to achieve the required hydrophobicity and porosity fine gradients. In this context, the word "carbon" has a general meaning, and it may either designate a purely carbonaceous particle (uncatalyzed carbon) or a carbonaceous particle supporting other species, for instance a metal or metal oxide catalyst (catalyzed carbon). For instance, the final coats may comprise a small amount of a hydrophobic carbon, a higher amount of a first hydrophilic carbon, and a second hydrophilic high surface area active carbon characterized by high surface area. Similarly, a gradient within the electrode layer can be achieved by coating different layers comprising different catalyzed carbons, wherein the final coats comprise more hydrophilic catalyzed carbons than the previous coats.

Noble metals, and in particular metals of the platinum group are the most common catalysts in gas diffusion electrode structure for most applications. Noble metals can be present in their elementary or oxide form, optionally in admixture with other metals or metal oxides, especially transition metals or metal oxides as known in the art.

According to the method of the invention, gas diffusers provided with fine gradients of hydrophobicity and porosity are preferably produced by coating a web, preferably a current conducting web, with multiple coats having a systematically varied composition. By systemically varied, it is intended that at least one parameter such as the carbon to binder ratio or the ratio between two different carbon particles is varied in a monotonous fashion, i.e. always decreasing or always increasing, even though the rate of variation between one coat and the next may not be constant.

In the following examples, there are described several preferred embodiments to illustrate the invention. However, it is to be understood that the invention is not intended to be limited to the specific embodiments.

Example 1

A carbon cloth with a warp-to-fill ratio of unity, with approximately 25 to 50 yams per inch, a carbon content of 97-99% and an average thickness of 10 mils was selected as the supporting web for all the gas diffusers of the present and the next examples. Appropriate weights of Shawinigan Acetylene Black (SAB) and of 20% Pt on Vulcan XC-72 catalyst were separately dispersed with an ultrasonic horn. The resulting dispersions were mixed with an aqueous suspension of PTFE to form different carbon/binder suspensions, four of which consisted of SAB and PTFE, with PTFE content ranging from 60 to 10% by weight, and the remaining three consisting of Pt on carbon black (20% Pt on Vulcan XC-72, hereafter indicated as "20% Pt/C") and PTFE, with PTFE content ranging from 50 to 10% by weight. The seven suspensions were sequentially applied by hand to the carbon web, with a drying step in ambient air after each coat and final sintering at 340° C. for 20 minutes. The composition and specific load of each layer is indicated in the following table:

| Layer # | Type of carbon component | PTFE % by weight | Specific load (mg/cm²) |
|---|---|---|---|
| 1 | SAB | 60 | 1.50 |
| 2 | SAB | 40 | 0.48 |
| 3 | SAB | 20 | 1.02 |
| 4 | SAB | 10 | 0.72 |
| 5 | 20% Pt/C | 50 | 0.20 |
| 6 | 20% Pt/C | 30 | 0.24 |
| 7 | 20% Pt/C | 10 | 0.43 |

The resulting gas diffusion electrode was further coated with 0.71 mg/cm² of Nafion®, from a 5% hydroalcoholic solution in multiple passes, with final drying in ambient air. Nafion is a trademark of DuPont, USA indicating a class of sulfonated perfluorinated ionomeric materials, both in form of ion-exchange membrane and as hydroalcoholic suspension ("liquid Nafion"). The porosity of the resulting sample has been checked by capillary flow porometry, whereby five measures were taken across the 100 micron thick structure, and the mean flow pore resulted to decrease quite regularly from 35 μm (value at 20 μm depth) to 0.08 μm (100 μm depth), as shown in the following table (gas side being 0 μm and catalyzed side being 100 μm):

| Depth (μm) | Mean flow pore (μm) |
|---|---|
| 20 | 35.7 |
| 40 | 9.73 |
| 60 | 0.831 |
| 80 | 0.112 |
| 100 | 0.083 |

The above sample, identified as "EX1", is an example of hand-coated gas diffusion electrode having a non-catalyzed portion provided with a first set of porosity and hydrophobicity fine gradients, and a catalyzed portion provided with a distinct set of porosity and hydrophobicity fine gradients.

Comparative Example 1

The method described in the above Example 1 was followed, except that only two suspensions were applied: four coats of the suspension used for layer 2 of Example 1 (40% PTFE, 60% SAB) were overlaid until reaching a coverage of 3.5 mg/cm². On top of these, three coats of a suspension of 60% carbon black supported catalyst (20% Pt/C) and 40% PTFE were applied, until reaching a loading of 0.39 mg of Pt/cm². The resulting gas diffusion electrode was sintered as in the previous example and further coated with 0.65 mg/cm² of Nafion, from a 5% hydroalcoholic solution in multiple passes, with final drying in ambient air. The porosity of the resulting sample has been checked by capillary flow porometry whereby four measures were taken across the 80 micron thick structure, and the mean flow pore showed a constant behavior within the non-catalyzed portion, with a steep decrease arising in correspondence of the activated portion:

| Depth (μm) | Mean flow pore (μm) |
|---|---|
| 20 | 20.5 |
| 40 | 2.31 |
| 60 | 2.68 |
| 80 | 0.55 |

This sample, identified as "CE1", is an example of bilayer hand-coated gas diffusion electrode free from porosity and hydrophobicity fine gradients.

Example 2

The method described in Example 1 was followed applying a series of carbon/PTFE suspensions in which the relative amount of PTFE was fixed at 50%, and the carbon composition was systematically varied. Three different carbon components were used, namely: the SAB carbon as in Example 1; bare Vulcan XC-72 carbon black; catalyzed Vulcan XC-72 (20% Pt/C). The composition and specific load of each layer is indicated in the following table:

| Layer #1 | Type of carbon component | PTFE % by weight | Specific load (mg/cm²) |
|---|---|---|---|
| 1 | SAB | 50 | 1.44 |
| 2 | SAB/Vulcan XC-72 3:1 | 50 | 0.56 |
| 3 | SAB/Vulcan XC-72 1:1 | 50 | 0.64 |
| 4 | SAB/20% Pt/C 1:1 | 50 | 0.72 |
| 5 | SAB/20% Pt/C 1:3 | 50 | 0.48 |
| 6 | 20% Pt/C | 50 | 0.27 |

The resulting gas diffusion electrode was sintered as in Example I and further coated with 0.73 mg/cm² of Nafion, from a 5% hydroalcoholic solution in multiple passes, with final drying in ambient air.

The sample, identified as "EX2", is an example of hand-coated gas diffusion electrode provided with porosity and hydrophobicity fine gradients across its entire thickness, including the catalyzed part.

Example 3

The method described in Example 1 was repeated, applying the following layers:

| Layer # | Type of carbon component | PTFE % by weight | Specific load (mg/cm²) |
|---|---|---|---|
| 1 | SAB | 60 | 0.83 |
| 2 | SAB | 50 | 0.72 |
| 3 | SAB | 40 | 0.77 |
| 4 | 20% Pt/C | 40 | 0.25 |
| 5 | 20% Pt/C | 30 | 0.25 |

The resulting gas diffusion electrode was sintered as in the previous example and further coated with 0.73 mg/cm² of Nafion, from a 5% hydroalcoholic solution in multiple passes, with final drying on ambient air. This sample, identified as "EX3", is another example of hand-coated gas diffusion electrode provided with porosity and hydrophobicity fine gradients across its entire thickness, including the catalyzed part.

Comparative Example 2

An electrode equivalent to the one of Comparative Example 1 was prepared, except that gravure automated coating was employed and 30% Pt on Vulcan XC-72 (30% Pt/C in the following) was chosen as the catalyst. The carbon cloth web was rolled past a 12.7 mm diameter, 250 mm long gravure head rotating at 100 rpm, as disclosed in Example 57 of U.S. Pat. No. 6,103,077. The gravure head had a 5.3 cell/cm pattern across the surface to aid in pick-up and distribution of the mix. The web was first coated with a 1:1 by weight SAB:PTFE mix at the rate of 2 m/min. Several coats were applied with air drying in-between coats, until reaching a load of 4 mg/cm$^2$. Then, several layers of 30% Pt on Vulcan XC-72 (in 1:1 admixture with PTFE) were applied at 1 m/min, with drying in-between coats, until a final load of 0.5 mg Pt/cm$^2$. The final assembly was sintered at 340° C. for 20 minutes and coated with 0.68 mg/cm$^2$ of Nafion from a 5% hydroalcoholic solution in multiple passes. This sample, identified as "CE2", is an example of machine-coated gas diffusion electrode free from porosity and hydrophobicity fine gradients.

Example 4

An electrode was prepared following the method of Comparative Example 2 and making use of the same gravure coating equipment. The following layers were applied, wherein layer 1 was coated on one side of the web (backside) and the remaining layers on the opposite side:

| Layer # | Type of carbon component | PTFE % by weight | Specific load (mg/cm$^2$) |
|---|---|---|---|
| 1 | SAB | 60 | 1.23 |
| 2 | SAB | 60 | 2.25 |
| 3 | SAB | 50 | 2.37 |
| 4 | 30% Pt/C | 40 | 0.30 |
| 5 | 30% Pt/C | 30 | 0.26 |

Layer 3 was applied in two coats, and layers 4 and 5 in multiple coats. After the application of layer 4, the electrode was cut in two parts, only one of which was coated with layer 5, sintered and Nafion-coated (0.73 mg/cm$^2$) as in the previous examples. The porosity of the resulting sample has been checked by capillary flow porometry, whereby five measures were taken across the 100 micron thick structure, and the mean flow pore resulted to decrease quite regularly the gas side to the catalyzed side:

| Depth (μm) | Mean flow pore (μm) |
|---|---|
| 20 | 57.4 |
| 40 | 7.50 |
| 60 | 0.646 |
| 80 | 0.154 |
| 100 | 0.023 |

This sample, identified as "EX4", is an example of machine-coated gas diffusion electrode provided with porosity and hydrophobicity fine gradients across the whole of its thickness, including the catalyzed part.

Example 5

The electrode portion of Example 4 which was not coated with layer 5 was sintered and Nafion coated (0.68 mg/cm$^2$) as in the previous examples. Its final composition was therefore as follows:

| Layer # | Type of carbon component | PTFE % by weight | Specific load (mg/cm$^2$) |
|---|---|---|---|
| 1 | SAB | 60 | 1.23 |
| 2 | SAB | 60 | 2.25 |
| 3 | SAB | 50 | 2.37 |
| 4 | 30% Pt/C | 40 | 0.30 |

This sample, identified as "EX5", is an example of machine-coated gas diffusion electrode provided with porosity and hydrophobicity fine gradients across its entire thickness, including the catalyzed portion. Such catalyzed portion is however thinner than in the previous example, and consists of a single layer, whose hydrophobicity and porosity are in accordance with the overall hydrophobicity and porosity gradients of the whole structure.

Example 6

The method described in Example 1 was repeated applying three non-catalyzed layers, and then two different catalytic coats. For the latter, two different catalyzed carbons were employed, namely the 30% Pt on Vulcan XC-72 of the two previous examples, and a 30% Pt.Cr alloy on Vulcan XC-72 (Pt:Cr 1:1 on atomic base). PTFE was used as a binder for the 30% Pt/C coat, while Nafion® was used for the Pt.Cr alloy.

| Layer # | Type of carbon component | Binder % by weight, type | Specific load (mg/cm$^2$) |
|---|---|---|---|
| 1 | SAB | 50, PTFE | 1.75 |
| 2 | SAB | 40, PTFE | 3.35 |
| 3 | 30% Pt/C | 40, PTFE | 0.25 |
| 4 | 30% PtCr/C | 25%, Nafion ® | 0.5 |

After forming layer #3, a first layer of 0.3 mg/cm$^2$ of Nafion® ionomer from a 5% hydroalcoholic solution was applied in multiple passes.

After applying layer #3, the resulting gas diffusion electrode was sintered as in the previous examples and further coated with 0.3 mg/cm$^2$ of Nafion, from a 5% hydroalcoholic solution in multiple passes, with final drying on ambient air.

The porosity of the resulting sample has been checked by capillary flow porometry, whereby four measures were taken across the 80 micron thick structure, and the mean flow pore showed a constant behavior throughout the whole thickness:

| Depth (μm) | Mean flow pore (μm) |
|---|---|
| 20 | 45.8 |
| 40 | 8.61 |
| 60 | 0.189 |
| 80 | 0.05 |

This sample, identified as "EX6", is an example of hand-coated gas diffusion electrode provided with porosity and hydrophobicity fine gradients across the whole of its thickness, including the catalyzed part.

The seven samples resulting from the above five examples and two comparative examples were characterized in a fuel cell operating at 100° C. under a low pressure of hydrogen and air (1.5 bar). From each sample, two identical electrodes were obtained, one of which was used as the anode and the other as the cathode. The generated current density at two fixed cell voltage values (0.7 and 0.5 V) were recorded after two days of stable operation and reported in the following table:

| Sample # | Current density at 0.7 V | Current density at 0.5 V |
|---|---|---|
| EX1 | 6.8 kA/m$^2$ | 12.0 kA/m$^2$ |
| CE1 | 5.0 kA/m$^2$ | 10.2 kA/m$^2$ |
| EX2 | 6.4 kA/m$^2$ | 11.8 kA/m$^2$ |
| EX3 | 6.8 kA/m$^2$ | 11.9 kA/m$^2$ |
| CE2 | 5.4 kA/m$^2$ | 10.6 kA/m$^2$ |
| EX4 | 7.8 kA/m$^2$ | 13.4 kA/m$^2$ |
| EX5 | 6.9 kA/m$^2$ | 12.0 k/Am$^2$ |

The electrodes of Examples 1-5 had a more consistent enhanced performance than those of the comparative examples, regardless of the fact that they were hand-made or machine-coated, and regardless that 20% or 30% Pt on carbon black was used as the catalyst. The three machine-coated samples were also tested at 70° C., first under a low pressure of hydrogen and air (1.5 bar), then at the same pressure after switching the cathode feeding to pure oxygen, to obtain "oxygen gain" data. In other words, cell voltages were measured at fixed current density under air and under oxygen cathode feeding, then the voltage obtained under air was subtracted from the voltage obtained under oxygen at each selected current density. Such data are reported in the table below:

| Sample # | O$_2$ gain/ 1 kA/m$^2$ | O$_2$ gain/ 4 kA/m$^2$ | O$_2$ gain/ 6 kA/m$^2$ | O$_2$ gain/ 10 kA/m$^2$ |
|---|---|---|---|---|
| CE2 | 29.1 mV | 51.6 mV | 61.7 mV | 89.9 mV |
| EX4 | 26.0 mV | 43.4 mV | 51.0 mV | 72.1 mV |
| EX5 | 30.7 mV | 46.9 mV | 56.3 mV | 80.1 mV |

Under operation at 70° C., the equation (2.303 RT/nF) Log(p O$_2$[oxygen]/p O$_2$[air]) predicts an oxygen gain of 11.9 mV based on purely thermodynamic conditions. This value essentially fixes the lower limit expected for oxygen gain. The magnitude of experimental oxygen gain can be ascribed to the electrode structure, wherein a decrease in oxygen gain indicates an improvement in mass transport.

Various modifications of the gas diffuser and the invention may be made without departing from the spirit or scope thereof and it is to be understood that the invention is intended only to be limited as defined in the appended claims.

What we claim is:

1. A gas diffuser for a membrane electrochemical cell comprising (i) a web and (ii) at least one multilayer coating applied thereto, said coating simultaneously having (a) a porosity fine gradient and (b) a hydrophobicity fine gradient established across its thickness, said porosity fine gradient (a) and said hydrophobicity fine gradient (b) both always decrease in the direction from the surface in contact with said web (i) to the opposite surface and said porosity fine gradient (a) and said hydrophobicity fine gradient (b) are extended within an electrocatalytic layer on top of the multilayer coating surface said electrocatalytic layer being arranged opposite to the web.

2. The gas diffuser of claim 1 wherein said multilayer coating comprises individual layers containing carbon and binder particles.

3. The gas diffuser of claim 2 wherein said carbon particles comprise at least one more hydrophobic carbon, optionally an acetylene black or graphite, and one more hydrophilic carbon, optionally a carbon black.

4. The gas diffusion electrode of claim 3 wherein said at least one more hydrophilic carbon is catalyzed.

5. The gas diffuser of claim 3 wherein said fine gradients are obtained by overlaying individual layers with different binder to carbon weight ratio and/or with different weight ratio between said more hydrophobic carbon and said more hydrophilic carbon.

6. The gas diffuser of claim 5 wherein said binder to carbon weight ratio is between 0.1 and 0.7.

7. The gas diffuser of claim 5 wherein said weight ratio between said more bydrophobic carbon and said more hydrophilic carbon is between 1:9 and 9:1.

8. The gas diffuser of claim 2 wherein said binder particles are made of a polymeric material optionally fluorinated.

9. The gas diffuser of claim 1 wherein said multilayer coating comprises from three to eight layers.

10. The gas diffuser of claim 1 wherein said electrocatalytic layer comprises metals or metal oxides of the group of platinum or alloys thereof.

11. An electrochemical cell comprising at least one gas diffuser of claim 1.

12. The cell of claim 11 which is a membrane fuel cell or a hydrochloric acid electrolysis cell.

* * * * *